(12) United States Patent
Abe et al.

(10) Patent No.: US 7,386,574 B2
(45) Date of Patent: Jun. 10, 2008

(54) FILE TRANSFER SYSTEM, APPARATUS, METHOD AND COMPUTER READABLE MEDIUM STORING FILE TRANSFER PROGRAM

(75) Inventors: Tsuyoshi Abe, Tokyo (JP); Masahisa Kawashima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 465 days.

(21) Appl. No.: 10/344,900

(22) PCT Filed: Aug. 30, 2001

(86) PCT No.: PCT/JP01/07484

§ 371 (c)(1),
(2), (4) Date: Feb. 26, 2003

(87) PCT Pub. No.: WO02/19118

PCT Pub. Date: Mar. 7, 2002

(65) Prior Publication Data

US 2003/0187852 A1    Oct. 2, 2003

(30) Foreign Application Priority Data

Aug. 31, 2000    (JP)    ............................. 2000-263656

(51) Int. Cl.
*G06F 17/30* (2006.01)
(52) U.S. Cl. ...................... 707/200; 707/205; 709/201; 709/203; 709/219

(58) Field of Classification Search ................ 707/2–8, 707/200, 204–205; 709/201, 203, 219
See application file for complete search history.

(56) References Cited

U.S. PATENT DOCUMENTS 5,053,945 A * 10/1991 Whisler ...................... 707/200
5,931,925 A    8/1999 McNabb et al. .............. 710/52

(Continued)

FOREIGN PATENT DOCUMENTS

CN    1184285    6/1998

(Continued)

OTHER PUBLICATIONS

Tsuyoshi Abe et al.: "A high efficent file transfer system for large data" Proceedings of the 2000 Communications Society Conference of IEICE Sep. 7, 2000.

*Primary Examiner*—Don Wong
*Assistant Examiner*—Hanh B Thai
(74) *Attorney, Agent, or Firm*—Oblon, Spivak, McClelland, Maier & Neustadt, P.C.

(57) ABSTRACT

A file transfer system including a relay apparatus is provided in which the relay apparatus includes: an incoming file sending part 15 which receives a file identifier I and a downloaded data amount O_R from a receive apparatus 50; and a file storing part 13 which stores the file identifier and file data and passes file data according to the file identifier and the downloaded data amount to the incoming file sending part. The file data F(O_R) is sent to the receive apparatus.

19 Claims, 8 Drawing Sheets

U.S. PATENT DOCUMENTS

| | | | |
|---|---|---|---|
| 5,978,791 A * | 11/1999 | Farber et al. | 707/2 |
| 6,098,180 A | 8/2000 | Kobata et al. | |
| 6,148,334 A * | 11/2000 | Imai et al. | 709/219 |
| 6,598,070 B1 * | 7/2003 | Saito | 709/200 |
| 6,801,546 B1 * | 10/2004 | Yoshida et al. | 370/490 |
| 2002/0049760 A1 * | 4/2002 | Scott et al. | 707/10 |

FOREIGN PATENT DOCUMENTS

| | | |
|---|---|---|
| EP | 0 862 304 A2 | 9/1998 |
| JP | 58-161032 | 9/1983 |
| JP | 63-143657 | 6/1988 |
| JP | 1-211147 | 8/1989 |
| JP | 5-324451 | 12/1993 |
| JP | 10-500791 | 1/1998 |
| JP | 10-133970 | 5/1998 |
| JP | 10-240602 | 9/1998 |
| WO | WO 95/03679 | 2/1995 |

* cited by examiner

FILE TRANSFER SYSTEM, APPARATUS, METHOD AND COMPUTER READABLE MEDIUM STORING FILE TRANSFER PROGRAM

TECHNICAL FIELD

The present invention relates to a file transfer technique for transferring a file (information which has a given purpose). More particularly, the present invention relates to a file transfer technique in which file data is sent to a receive apparatus according to the amount of data which has been received by the receive apparatus. The amount is provided from the receive apparatus. According to the file transfer technique, the time required for sending and receiving a file becomes short, and, time required for waiting until the receive apparatus can start to receive the file does not increase in proportion to the file size and the number of relay apparatuses.

BACKGROUND ART

A system which transfers a file from a sending side terminal (which will be called a send apparatus hereinafter) to another terminal which is in a receiving side (which will be called a receive apparatus hereinafter) by using a network is called a file transfer system.

As an example of a conventional file transfer system, there is a method in which a file is directly sent from the send apparatus to the receive apparatus. As another example, there is a method in which a shared server is provided such as an FTP server or an HTTP server which includes a part for storing the file and a part for distributing the stored file to a terminal according to a request from the terminal. In addition, the send apparatus stores the file in the shared server and the receive apparatus receives the file from the shared server.

As an additional example, there is a method in which a file is transferred via a plurality of file relay apparatuses like E-mail.

As for the method in which the file is sent directly from the send apparatus to the receive apparatus, there is a problem in that the send apparatus and the receive apparatus should be activated simultaneously. In addition, as for the method in which the shared server is provided, although the send apparatus and the receive apparatus are not necessarily activated simultaneously, there is a problem in that file sending process by the send apparatus and file receiving process by the receive apparatus take time when the shared server is located far from the send apparatus and the receive apparatus.

Further, as for the method in which the file is transferred via a plurality of file relay apparatuses, the problem of taking time for file sending by the send apparatus and file receiving by the receive apparatus can be solved because the send apparatus and the receive apparatus can send a file to a nearest file relay apparatus and receive a file from a nearest file relay apparatus. However, a first relay apparatus can not send a file to a second file relay apparatus of a next stage until the first relay apparatus receives all of the file. The reason is that the file relay apparatus is forced to stop transferring a file to the next stage at some midpoint when file transfer speed of a file relay apparatus or a send apparatus of a previous stage is slower than file transfer speed to a file relay apparatus or a receive apparatus of a next stage. Thus, waiting time from the time when the send apparatus starts to send a file until the receive apparatus can start to receive the file increases in proportion to the file size and the number of the relay file transfer apparatuses.

In addition, according to a conventional file transfer method, a file transfer can not be performed while suspending and resuming file transfer at some midpoint. The reason is that, according to the conventional file transfer method, the relay apparatus can not send the amount of already stored data of the suspended file to the send apparatus, and, the send apparatus can not send data following data of the amount to the relay apparatus.

DISCLOSURE OF THE INVENTION

It is an object of the present invention to provide a file transfer system in which the time required for sending and receiving a file, and the waiting time until the receive apparatus can start to receive a file is not proportionate to the file size and the number of the relay apparatuses.

It is another object of the present invention to provide a file transfer system in which the send apparatus can suspend sending a file at some midpoint and resume sending the file.

The file transfer system of the present invention includes a file storing part, an originating file receiving part and an incoming file sending part. A send apparatus includes an originating file storing part and an originating file sending part. A receive apparatus includes an incoming file storing part and an incoming file receiving part.

A relay apparatus performs a store operation and a send operation independently in which the store operation is to store data which is received from the send apparatus in the file storing part and the send operation is to send the stored data to the receive apparatus by using the incoming file sending part. Therefore, it can be started to send a file to the receive apparatus before completing file receiving from the send apparatus. A relay apparatus includes an originating file information receiving part and an incoming file information sending part.

The send apparatus includes an originating file information sending part. The receive apparatus includes an incoming file information receiving part.

The relay apparatus receives a file size from the send apparatus by the originating file information receiving part before receiving the file, and associates the file size with the file identifier and registers it in the file storing part.

In addition, the relay apparatus notifies the receive apparatus of the file identifier and the file size by the incoming file information sending part before sending the file. The receive apparatus stores the file identifier and the file size received from the relay apparatus by the incoming file information receiving part in the incoming file storing part.

After the receive apparatus receives all data stored in the relay apparatus by the incoming file receiving part, the receive apparatus compares the file size with received data amount. When these are not the same, an operation of receiving data newly arrived to the relay apparatus is repeated. Thus, data transfer speed can be adjusted even when the speed for sending the file to the relay apparatus from the send apparatus is slower than the speed for receiving the file from the relay apparatus by the receive apparatus.

The relay apparatus may includes a transfer destination determining part, a file relay information sending part, a relay file sending part, a file relay information receiving part and a relay file receiving part. In this case, the relay apparatus judges whether the file needs to be transferred to another relay apparatus on the basis of the destination address group of the file. When it is necessary to transfer the file, the relay apparatus determines relay apparatus group to which the file should be transferred, and sends file relay information including a list of destination addresses, the file identifier and the file size.

A second relay apparatus which receives the file relay information from the relay apparatus of the previous stage by the file relay information receiving part stores the file relay information in the file information storing part, and receives data from the previous relay apparatus by the relay file receiving part. After receiving all data stored in the previous stage relay apparatus, the second relay apparatus compares the file size with received data. When these are not the same, the second relay apparatus repeats an operation of receiving data which is newly arrived to the previous stage relay apparatus.

Accordingly, since it becomes possible that the file may pass through a plurality of relay apparatuses while the file is sent from the send apparatus to the receive apparatus, each of the send apparatus and the receive apparatus can communicate with the nearest relay apparatus from the viewpoint of network route. Therefore, file sending can be completed fast for the send apparatus and file receiving can be completed fast for the receive apparatus.

The file storing part of the relay apparatus includes a part which stores send status indicating whether the send apparatus suspends file sending, the send file receiving part includes a part which changes the send status stored in the file storing part to suspending status, the incoming file sending part includes a part which sends the file send status first and sends data next when sending a file to the receive apparatus. The originating file sending part of the send apparatus includes a part which suspends file sending. The incoming file receiving part of the receive apparatus may includes a part which receives the file send status from the relay apparatus, suspends file receiving when the file send status is suspending status, and receive data of unreceived part of the file when the file send status is not suspending status.

In this case, since it is transmitted to the relay apparatus and the receive apparatus that the send apparatus suspends file sending, the relay apparatus and the receive apparatus need not continue to wait for continued data even after file sending is suspended.

The relay file sending part of the relay apparatus includes a part which sends the file send status first, and, then, sends file data. The relay file receiving part may include a part which receives the file send status from a relay apparatus of a previous stage, suspends receiving when the file send status is suspending status, receives data which is not yet received in the file when the file send status is not suspending status. In this case, since it is transmitted to a plurality of relay apparatuses which relay the file that the send apparatus suspends file sending, it is eliminated that each relay apparatus continues to wait for continued data even though file sending is suspended.

The relay apparatus may includes a received data amount responding part. The originating file receiving part includes a part which changes the file send status to a status indicating the status is not suspending status and adds received data to the tail end of the already stored file when the file send status stored in the file storing part is suspending status and when the file corresponding to the file identifier already exists. The originating file sending part of the send apparatus may include a part which inquires about a received data amount of the file to the relay apparatus, and sends data which follows data of notified data amount to the relay apparatus. In this case, the send apparatus can resume file sending from continued data, and the file send status which is stored in the file storing part of the relay apparatus becomes no suspending status. Therefore, the receive apparatus can resume file receiving. The relay file receiving part of the relay apparatus may includes a part which receives the file send status from a relay apparatus of the previous stage, and changes the file send status of the file stored in the file storing part to a status indicating that the status is not suspending status when received file send status is not suspending status. In this case, it is transmitted to each relay apparatus that the send apparatus resumes file sending and the send status stored in the file storing part in each relay apparatus becomes no suspending status. Therefore, file transfer between the relay apparatus resumes.

The present invention can be formed as the relay apparatus used in the file transfer system. In this case, the relay apparatus includes the incoming file sending part which receives the file identifier and a downloaded data amount from the receive apparatus, and a file storing part which stores the file identifier and file data of the file which are associated with each other and passes file data according to the file identifier and the downloaded data amount to the incoming file sending part. The incoming file sending part sends file data according to the downloaded data amount to the receive apparatus.

The present invention can be formed as each of the send apparatus and the receive apparatus used in the file transfer system.

In addition, the present invention can be formed as a file transfer method. In this case, the file transfer method includes a first step of generating a file identifier used for identifying the file when receiving a request of file sending, a second step of receiving a file size from the send apparatus before receiving data of the file and storing the file size and the file identifier which are associated with each other, a third step of requesting the send apparatus to send file data until received data reaches the file size, a fourth step of sending the file identifier and the file size to the receive apparatus before sending the file data to the receive apparatus, a fifth step of sending the file data to the receive apparatus until data amount received by the receive apparatus reaches the file size.

Further, the present invention can be formed as a computer readable medium storing a program for executing the above-mentioned method, and as the program.

Other objects, features and advantages of the present invention will become more apparent from the following detailed description when read in conjunction with the accompanying drawings.

PREFERRED EMBODIMENTS FOR CARRYING OUT THE INVENTION

In the following, embodiments of the present invention will be described with reference to figures.

First Embodiment

The first embodiment of the present invention will be described in the following.

Figure 1:
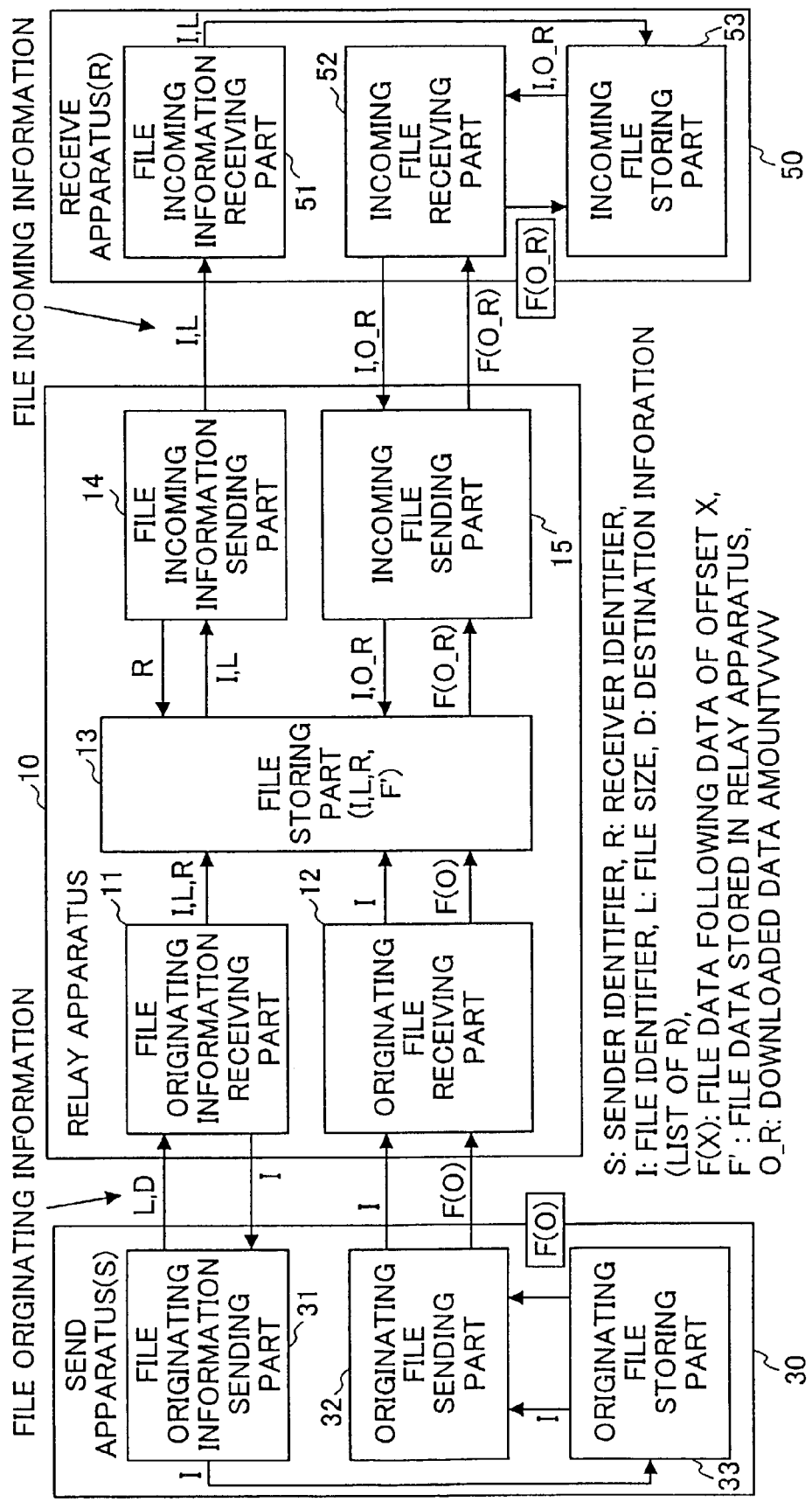
FIG. 1 is a schematic block diagram showing whole configuration of a file transfer system of a first embodiment.

FIG. 1 is a block diagram showing the whole configuration of the file transfer system of the embodiment. As shown in this figure, the file transfer system includes a send apparatus 30, a receive apparatus 50 and a relay apparatus 10 which is connected to the send apparatus 30 and the receive apparatus 50 such that the relay apparatus 10 can exchange data with the send apparatus 30 and the receive apparatus 50. Each of the send apparatus 30, the receive apparatus 50 and the relay apparatus 10 is realized by launching a program based on the following processing methods on a computer which has a network interface.

The program of the invention can be stored in a CD-ROM and the like, and can be distributed. In addition, the program can be distributed by allowing download via a network. By installing the program which is stored in the CD-ROM or downloaded in a computer, the computer can be used as the send apparatus, relay apparatus or the receive apparatus of the present invention.

The send apparatus 10 includes a file originating information sending part 31, an originating file storing part 33 and an originating file sending part 32.

The file originating information sending part 31 sends, to the relay apparatus 10, file originating information which includes a character string representing originating file information sending, a file size L of a file to be sent and an destination IP address R. In addition, the file originating information sending part 31 receives the file identifier I and passes the file identifier I to the originating file storing part 33.

The originating file storing part 33 reads file data which is stored in itself or in other storing apparatus on the basis of the file identifier I, and passes the file data to the originating file sending part 32 with the file identifier I.

The originating file sending part 32 receives the file data from the originating file storing part 33 with the file identifier I, and sends the file data and the file identifier I to the relay apparatus 10 with a character string representing originating file sending.

The relay apparatus 10 includes a file originating information receiving part 11, an originating file receiving part 12, a file storing part 13, a file incoming information sending part 14 and an incoming file sending part 15.

The file originating information receiving part 11 can receive the file size L and the destination address R from the send apparatus, and can generate the file identifier I and a file path P and can provide the file identifier I and the file path P to the file storing part 13.

The originating file receiving part 12 can receive the file identifier I and the file data F(x) from the send apparatus, and can provide these to the file storing part 13, wherein "x" means the amount of data (offset) which has been read and sent to the relay part in the file data.

The file incoming information sending part 14 can receive a POST method sent from the receive apparatus 50, and can obtain an IP address R of the receive apparatus. In addition, the file incoming information sending part 14 has functions of searching a file table in the file storing part 13 for a pair of the file identifier I and the file size L which are associated with the IP address R, obtaining the pair, and notifying the receive apparatus 50 of the pair of the file identifier I and the file size L.

The incoming file sending part 15 can receive the file identifier I and a downloaded data amount O_R from the receive apparatus 50, and can receive file data F(O_R) according to the file identifier I and the downloaded data amount O_R from the file storing part 13. In addition, the incoming file sending part 15 has a function of sending the file data F(O_R) to the receive apparatus 50. The downloaded data amount is the amount of data which has been received by the receive apparatus 50 in the file data.

The file storing part 13 has functions of storing the file identifier I, the file path P, the file size L and the destination IP address R sent from the file originating information receiving part while associating these with each other, storing the file data F' sent from the originating file receiving part in an area specified by the file path P, passing the file identifier I and the file size L to the file incoming information sending part 14 according to the destination address R from the file incoming information sending part 14, and passing the file data F(O_R) corresponding to the file identifier I and the downloaded data amount O_R from the incoming file sending part 15 to the incoming file sending part 15.

The receive apparatus 50 includes a file incoming information receiving part 51, an incoming file storing part 53 and an incoming file receiving part 52.

The file incoming information receiving part 51 has functions of receiving file incoming information which includes the file identifier I and the file size L from the relay apparatus 10, determining a file path P' which indicates storing destination of the file on the basis of the file identifier I, and providing the file identifier I, the file path P' and the file size L to the incoming file storing part 53.

The incoming file storing part 53 has functions of passing the file identifier I and the downloaded data amount O_R of the file on the basis of the file identifier I, the file path P' and the file size L from the file incoming information receiving part 51 to the incoming file receiving part 52, receiving the file data F(O_R) which is a part or all of the file data from the incoming file receiving part 52, and storing the file data F(O_R).

The incoming file receiving part 52 has functions of receiving the file identifier I and the downloaded data amount O_R of the file from the incoming file storing part 53, passing these to the relay apparatus 10, receiving the file data F(O_R) sent from the relay apparatus 10 according to the file identifier I and the downloaded data amount O_R of the file, and passing it to the incoming file storing part 53.

In the relay apparatus 10, an HTTP server process is launched, and a relay apparatus program which is implemented as a CGI program or a servlet can be launched by an HTTP post method for an URL. The URL is taught to the send apparatus 30 and the receive apparatus 50 beforehand.

In addition, in the relay apparatus 10, a relational database management system (RDBMS) is launched, and a table is prepared for storing a pair of the file identifier, the file path, the file size and the destination IP address. This table of the database is called a file table. The file table and a disk area in which the file is actually stored can be configured as the file storing part 13.

Each of the parts 31-33, 11-15, 51-53 is not necessarily an independent part. These may be realized by a microprocessor and a storing apparatus which stores a program.

Figure 2:
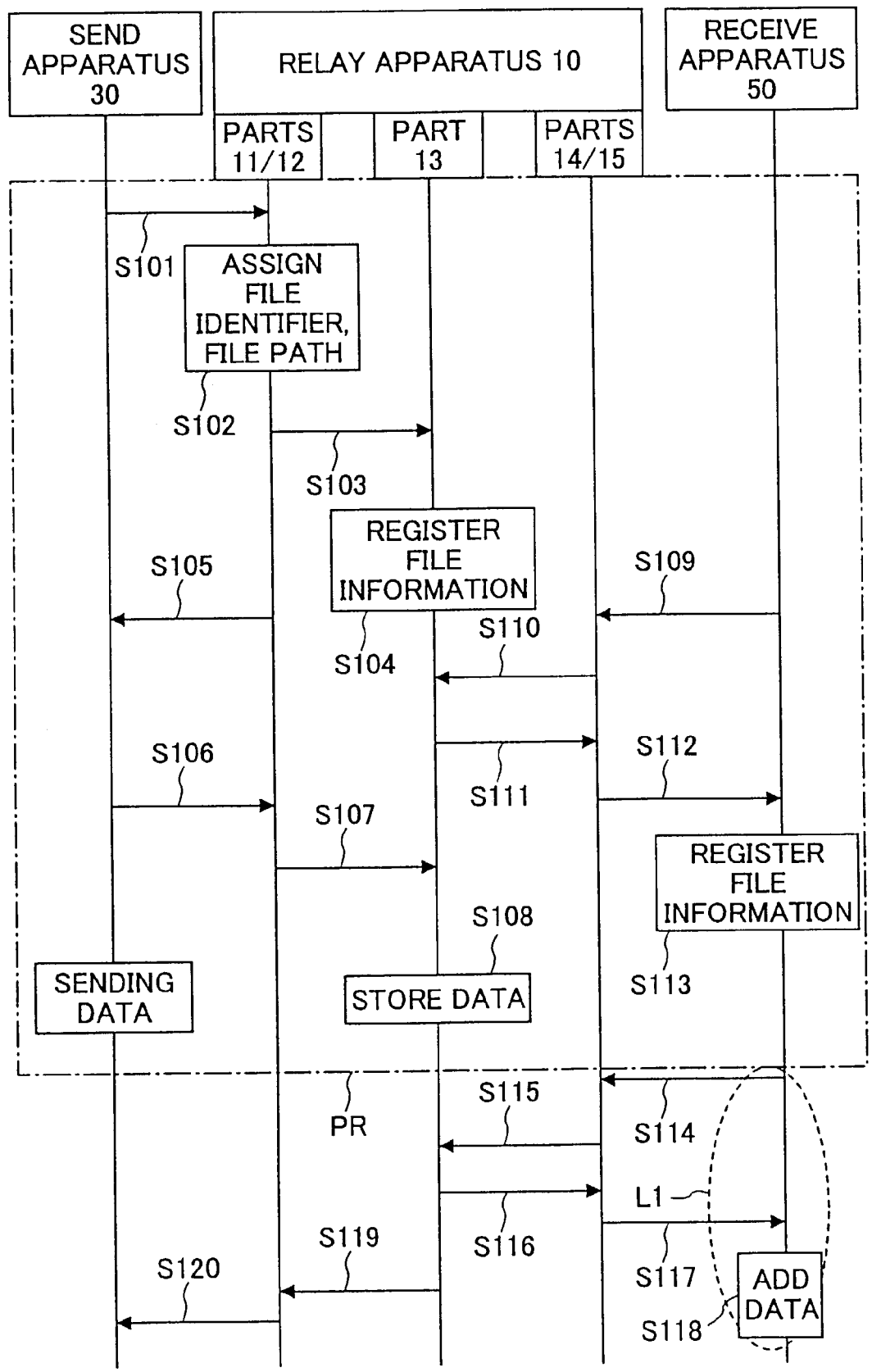
FIG. 2 is a flowchart showing an outline of processing flow of the first embodiment.

Next, a processing procedure according to this embodiment will be described with reference to FIG. 2. FIG. 2 is a flowchart showing an outline of the processing procedure of the embodiment.

First, processes performed between the send apparatus 30 and the relay apparatus 10 will be described. The send apparatus 30 stores a character string representing "originating file information send", the file identifier I, the file size L of a file to be sent and a destination IP address D in an entity body of a POST method of an HTTP request while separating them by line feeds, and sends them to the relay apparatus 10 in step 101.

In the file originating information receiving part 11 which is realized by a relay apparatus program launched by an HTTP server, when the first line of the entity body of the POST method received from the send apparatus 30 is the character string representing "originating file information send", the file originating information receiving part 11 reads the file size L of the file to be sent and the destination IP address R which follows the character string, generates a unique value for the file based on time information, and assigns this value as the file identifier I in step 102.

Then, the file originating information receiving part 11 determines the file path P which indicates storing destination of the file on the basis of the file identifier I, and sends the file identifier I, the file path P, and the file size L and the destination address R to the file storing part 13 in step 103.

The file storing part 13 stores these information in the file table in step 104.

In addition, the file originating information receiving part 11 notifies the send apparatus 30 of a character string representing the file identifier I by including the character string in an entity body of an HTTP response in step 105.

When the send apparatus 30 receives the entity body of the HTTP response including the character string representing the file identifier I, the send apparatus 30 reads the file identifier I from it, stores a character string indicating "originating file send" and the file identifier I in an entity body of a POST method of an HTTP request by separating them by a line feed, and stores binary sequence of file data corresponding to the file identifier I and starts to send it to the relay apparatus 30 in step 106.

The process in the send apparatus 30 is performed in the following way. First, the file originating information sending part 31 of the send apparatus 30 receives the entity body of the HTTP response including the file identifier I, and, the file originating information sending part 31 reads the file identifier I, passes the file identifier I to the originating file storing part 33. The originating file storing part 33 reads file data F(x) on the basis of the file identifier I, and passes the file identifier I and the file data to the originating file sending part 32. The originating file sending part 32 stores a character string representing "originating file send" and the file identifier I while separating by a line feed, after that, stores binary sequence of the file data in the entity body of the POST method of the HTTP request, and starts to send the data to the relay apparatus 10.

In the relay apparatus 10 which is realized by a relay apparatus program launched by the HTTP server, when the first line of the entity body of the POST method is a character string representing "originating file send", the originating file receiving part 12 reads the file identifier I which follows the character string, and obtains a file path P which is stored by being associated with the file identifier I from the file table stored in the file storing part 13. In addition, the originating file receiving part 12 reads the file data stored in the entity body following the file identifier, and starts to store the file data in an area of the file storing part 13 which is specified by the file path P in step 107. In the same way, the file data continues to be stored until all of the file data is stored in the file storing part 13 in step 108.

When all of the file data is stored in the file storing part 13, the relay apparatus 10 notifies the send apparatus 30 of data storing completion in steps 119 and 120. The send apparatus 30 ends file transfer process according to the notification.

Next, processes performed between the receive apparatus 50 and the relay apparatus 10 will be described.

The receive apparatus 50 stores a character string representing "incoming file information request" in an entity body of a POST method of an HTTP request, and sends the HTTP request to the relay apparatus 10 by using an URL which has been taught beforehand as send destination in step 109.

In the relay apparatus 10 which is realized by a relay apparatus program launched by the HTTP server, when the first line of the entity body of the POST method sent from the receive apparatus 50 is a character string representing "incoming file information request", the file incoming information sending part 14 obtains an IP address R of an HTTP client which is notified by HTTP, searches the file table of the file storing part 13 for a pair of the file identifier I and the file size L which are stored in concert with the IP address R in step 110, and obtains these in step 111. Then, the file incoming information sending part 14 stores the pair of the file identifier I and the file size L in an entity body of an HTTP response for the receive apparatus 50 while separating the pair by a line feed, and returns the HTTP response to the receive apparatus 50 in step 112.

The receive apparatus 50 reads the pair of the file identifier I and the file size L from the entity body of the HTTP response, determines a file path P' which is associated with the file identifier I and is file storing destination, and stores file information including the file identifier I, the file size L and the file path P' in step 113. For example, the file information can be stored as an array of a structure which has these information as elements. In addition, the file information may includes received data amount O_R for the file (which is 0 for the first time around).

Next, the receive apparatus 50 stores character strings representing "incoming file request", the file identifier I, received data amount O_R (which is 0 for the first time around) in the entity body of the POST method by separating the character strings by line feeds, and sends the POST method to the relay apparatus 10 in step 114.

Next, when the first line of the entity body of the POST method is a character string representing "incoming file request", the relay apparatus 10 which is realized by the relay apparatus program launched by the HTTP server reads the file identifier I and received data amount O_R which follows the character string, obtains the file path P which is stored in combination with the file identifier I from the file table of the file storing part 13, reads file data which follows data of the received data amount O_R of the file corresponding to the file path P in step 116, stores the file data in an entity body of an HTTP response and returns the HTTP response to the receive apparatus 50 in step 117.

The receive apparatus 50 which receives the HTTP response obtains the file path P' of the file from the stored file information, adds content of the entity body of the HTTP response to the file data which has been stored in the file path P' in step 118, wherein the content is file data following the received data amount O_R in the file.

The procedures from the step 114 to step 118 are repeated until the received data amount O_R reaches the file size L (L1).

In the case that receive speed of the receive apparatus 50 exceeds send speed of the send apparatus 30 and the receive apparatus 50 completes receiving the file data stored in the relay apparatus 10 before the send apparatus 30 completes sending all data, the receive apparatus 50 repeatedly requests the relay apparatus 10 to send remaining data until the received data amount O_R reaches the file size L in step 114, L1.

Although a case that a file is transferred to one receive apparatus has been described as an example in the above description, the present invention can be applied for a case that a file is transferred to a plurality of receive apparatuses (multicast). In this case, destination address group D including addresses $R_1$-$R_N$ of a plurality of receive apparatuses, instead of destination address R, may be sent to the relay apparatus 10 from the send apparatus 30. The relay apparatus 10 may store each of the addresses $R_1$-$R_N$ in the file table while associating it with the file identifier I, the file path P and the file size L.

Second Embodiment

In the following, a second embodiment of the present invention will be described. This embodiment is different from the first embodiment in that a file is transferred form the send apparatus to the receive apparatus via a plurality of relay apparatuses.

In this embodiment, the send apparatus 30, the receive apparatus 50 and the relay apparatus 10' are the same as the send apparatus 30, the receive apparatus 50 and the relay apparatus 10 in the first embodiment basically. Different points of the second embodiment from the first embodiment are that a plurality of relay apparatuses are provided between the send apparatus and the receive apparatus, and each of the relay apparatuses has a transfer destination determining part 16 which includes a table of a database storing a pair of a network part of an IP address and a URL of the transfer destination relay apparatus. This table is called "routing table". When "default" is stored in a field where the network part of the IP address should be input, the "default" means an address which does not correspond to any other rows of the routing table. When "local" is stored in a field where the URL of the transfer destination relay apparatus should be input, it means that data need not be sent to other relay apparatus.

Figure 3:
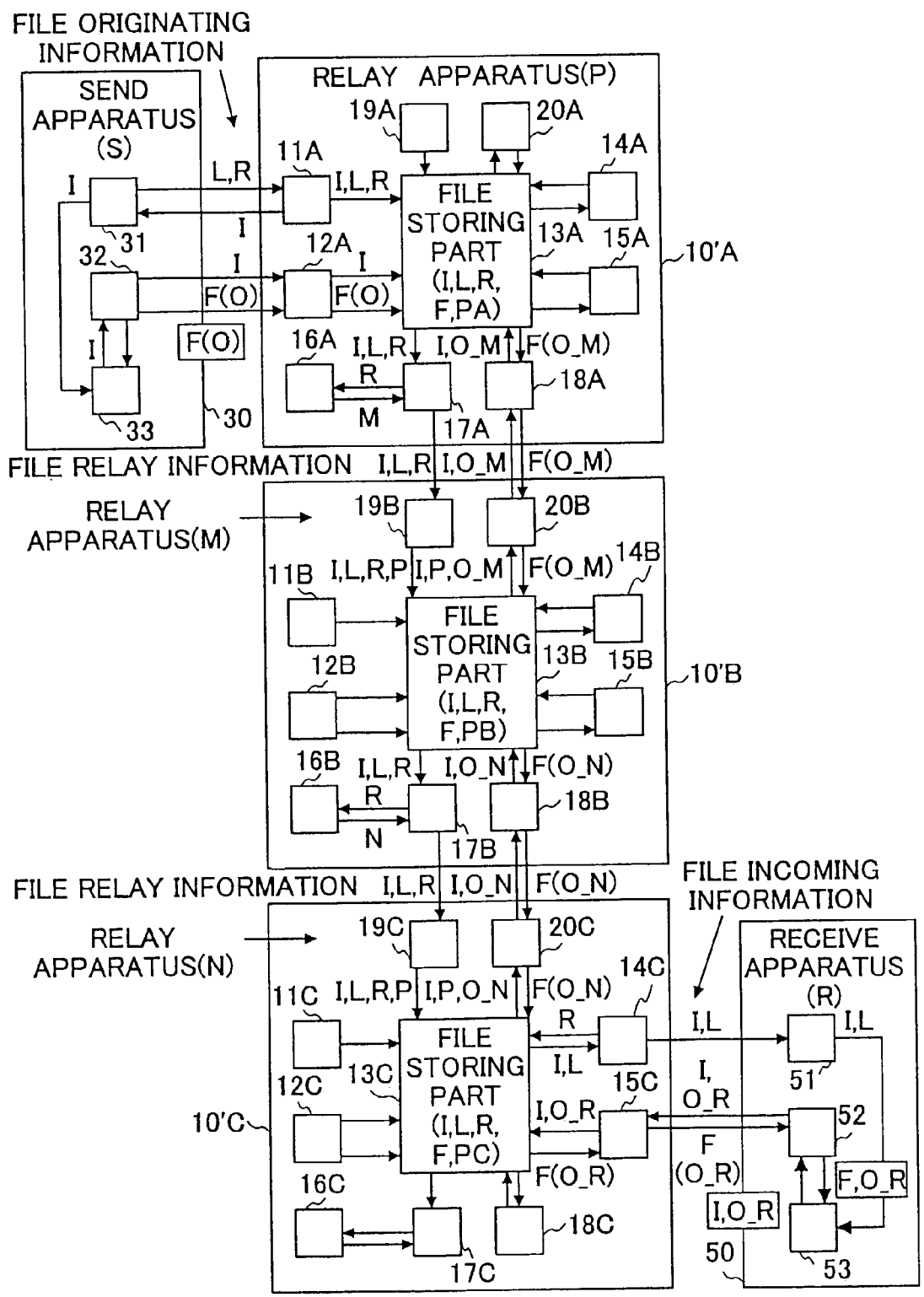
FIG. 3 is a schematic block diagram showing whole configuration of a file transfer system of a second embodiment.

FIG. 3 is a schematic block diagram showing a whole structure of the file transfer system of this embodiment.

The send apparatus 30 and the receive apparatus 50 are connected via relay apparatuses 10'A, 10'B, 10'C in this order for sending data. As for the relay apparatuses 10'A, 10'B, 10'C, since the configurations are the same, the relay apparatus 10'A will be described as a representative.

In the figures of this application, parts which have the same number have the same name wherein A, B or C is added to numbers of some parts. For example, each of 11, 11A, 11B, and 11C indicates a part named as the file originating information receiving part.

The relay apparatus 10'A includes a file originating information receiving part 11A, an originating file receiving part 12A, a file storing part 13A, a file incoming information sending part 14A and an originating file sending part 15A. These parts are the same as corresponding parts in the relay apparatus 10 in the first embodiment. In addition, the relay apparatus 10'A includes a transfer destination determining part 16A, a file relay information sending part 17A, a relay file sending part 18A, a file relay information receiving part 19A and a relay file receiving part 20A.

The transfer destination determining part 16A includes a routing table for storing a pair of a network part of an IP address and a URL of the transfer destination relay apparatus, and has a function of receiving an destination address from the file relay information sending part 17A and returns a URL of a transfer destination relay apparatus corresponding to the destination address to the file relay information sending part 17A.

The file relay information sending part 17A has functions of receiving a file identifier I, a file size L and a destination address R from the file storing part 13A, passing the destination address R to the transfer destination determining part, receiving the URL of the transfer destination relay apparatus corresponding to the destination address R, and sends file relay information to the URL.

The relay file sending part 18A has functions of receiving the file identifier I and received data amount (which is represented by O_M in the relay apparatus 10'A) from a relay apparatus of a next stage, passing the file identifier I and the received data amount to the file storing part 13A, receives file data F(O_M) sent from the file storing part 13A, and sending the file data to the next stage relay apparatus.

The file relay information receiving part 19A has functions of receiving file relay information from a relay apparatus of a previous stage, generating a file path PA on the basis of a file identifier in the information, and passing the file path PA with the file relay information to the file storing part 13A.

The relay file receiving part 20A has functions of receiving the file data sent from the previous stage relay apparatus, passing the file data to the file storing part 13A, and, receiving the file identifier and received data amount of the previous stage relay apparatus from the file storing part and passing these to the previous stage relay apparatus.

Figure 4:
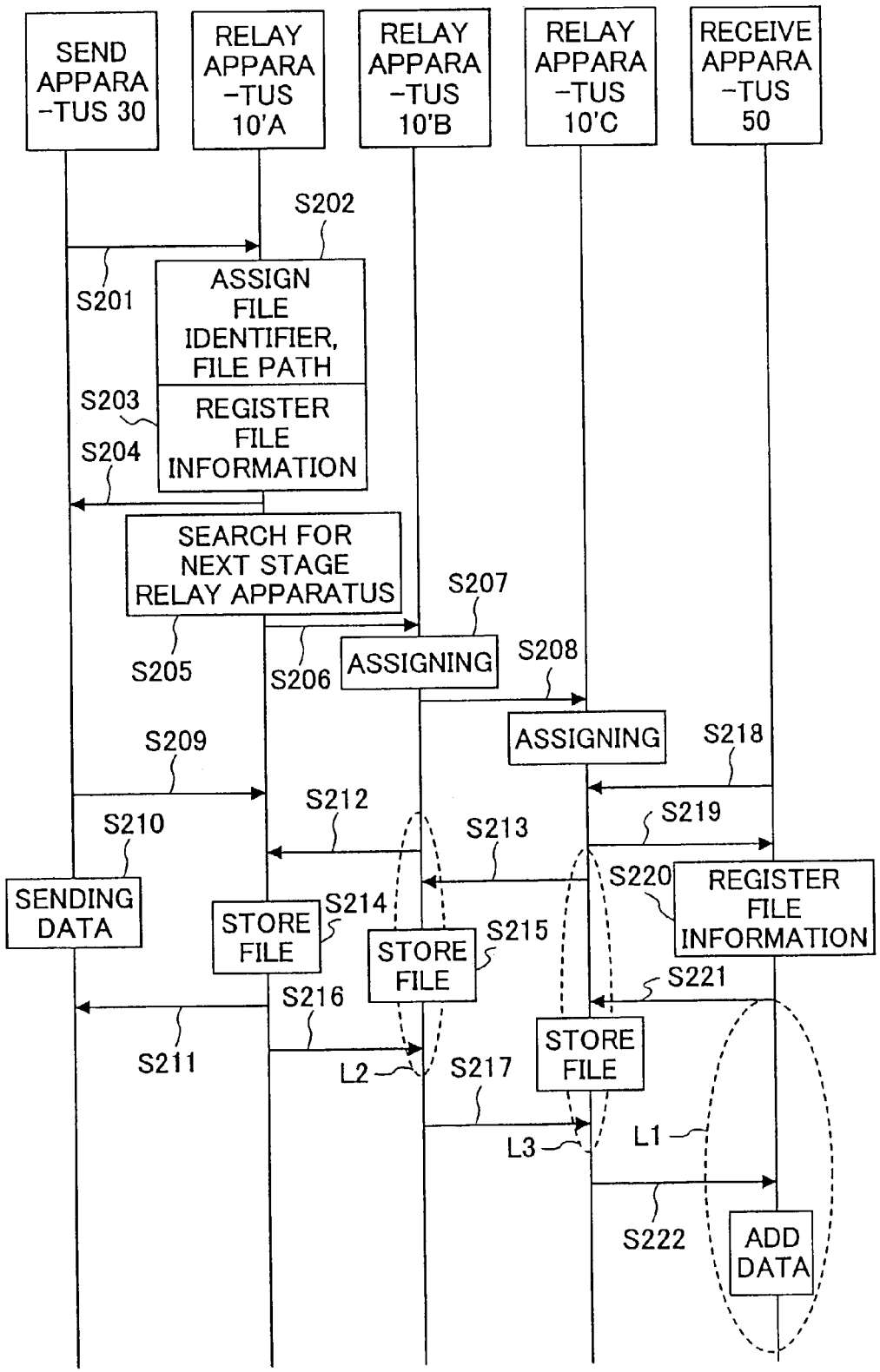
FIG. 4 is a flowchart showing an outline of processing flow of the second embodiment.

Next, process procedure of the present embodiment will be described with reference to FIG. 4. FIG. 4 is a flowchart showing an outline of process flow of this embodiment.

The send apparatus 10 notifies the nearest relay apparatus 10'A of a file size and a destination IP address of a file to be sent in the same way as that of the first embodiment in steps 201-204.

The relay apparatus 10'A assigns a unique value as the file identifier I for the file on the basis of time information and the IP address P of the relay apparatus 10'A. Then, the relay apparatus 10'A registers the file identifier I, the file size L and the destination IP address R in the file storing part 13A in the same way as the first embodiment, and notifies the send apparatus 30 of the file identifier I in step 204.

In addition, the relay apparatus 10'A checks the destination IP address R against the network part of the routing table 16A. When there is a match, the relay apparatus 10'A obtains URL "M" of a corresponding transfer destination relay apparatus 10'B in step 205.

Next, the relay apparatus 10'A sends relay file information to the URL "M" in step 206, wherein the relay file information includes character strings representing "relay file information send", the file identifier I, the file size L and the destination IP address R passing through the relay apparatus 10'B which are separated by line feeds and are stored in an entity body of a POST method of an HTTP request.

In the relay apparatus 10'B which received the POST method of the HTTP request, when the first line of the entity body of the POST method is a character string representing "relay file information send", the relay apparatus program launched by the HTTP server reads the file identifier I, the file size L and the destination IP address R which follows the character string. In addition, the relay apparatus 10'B determines a file path PB to which the file is stored on the basis of the file identifier, and stores the file identifier I, the file path PB, the file size L and the destination address R in the file storing part 13B (in the file table more specifically). In addition, the relay apparatus 10'B checks the destination IP address R against the network part of the routing table 16B. When there is a match, the relay apparatus 10'B obtains URL "N" of a corresponding transfer destination relay apparatus 10'C in step 207.

Next, the relay apparatus 10'B sends relay file information to the URL "N" in step 208, wherein the relay file information includes character strings representing "relay file information", the file identifier I, the file size L and the destination IP address R via the relay apparatus 10'B which are separated by line feeds and are stored in an entity body of the POST method of the HTTP request.

Accordingly, the file information reaches finally the relay apparatus which is the nearest to the receive apparatus 50 and takes charge of the destination address R.

On the other hand, the send apparatus 30 starts to send content data (which will be called "file data") of the file to the nearest relay apparatus 10'A while establishing association with the file identifier I in the same way as that of the first embodiment in step 209.

The relay apparatus 10'A reads the sent file data, starts to store the file data in an area of the file storing part 13A which is specified by the file path PA. Storing of the file data is repeated until all of the file data is stored in the file storing part 13A. When all of the file data is stored in the file storing part 13A, the relay apparatus 10'A notifies the send apparatus 30 of completion of data storing in step 211. The send apparatus 30 ends the file transfer process according to the notification.

When the relay apparatuses 10'B and 10'C other than the nearest relay apparatus receives "relay file information", each of the relay apparatuses stores "relay file request", the file identifier I, received data amount O_M or O_N (which is 0 in the first time) which are separated by line feeds, sends these to the previous stage relay apparatus 10'A, 10'B respectively in steps 212 and 213.

When the first line of the entity body of the POST method is a character string representing "relay file request", the relay apparatus program of the relay apparatus 10'A or 10'B of the previous stage launched by the HTTP server in response to the above-mentioned relay file request reads the file identifier I and received data amount O_M or O_N which follow the character string, obtains the file path PA or PB which is associated with the file identifier I from the file table of the file storing part 13A or 13B, stores file data following the file data of the file path PA or PB of the received data amount O_M or O_N in an entity body of an HTTP response in steps 214 and 215, and sends it to the relay apparatus 10'B or 10'C of the next stage in steps 216 and 217.

When received file data which is stored in the previous stage, each of the relay apparatuses 10'B and 10'C other than the relay apparatus 10'A which is nearest to the send apparatus 30, requests file data which is remained in the relay apparatus. In response to this, each of the relay apparatuses 10'A and 10'B sends the file data to the relay apparatuses 10'B and 10'C respectively in response to the request (L2, L3). This process is repeated until the received data amount O_M, O_N reaches the file size L which has been notified of by the file relay information.

The receive apparatus 50 makes an inquiry, to the nearest relay apparatus 10'C, about newly arriving file information to the destination address R in step 218. In response to this inquiry, the relay apparatus 10'C sends the file identifier I and the file size L to the receive apparatus 50 in step 219. The receive apparatus 50 stores the file identifier I and the file size L as file information in step 220. In addition, the receive apparatus 50 requests, to the relay apparatus 10'C, transfer of file data which is associated with the file identifier I and is stored in the relay apparatus 10'C in step 221. In response to this request, the relay apparatus 10'C sends the file data to the receive apparatus 50 in step 222.

If the received data amount O_R does not reach the file size L even when the receive apparatus 50 completes receiving data stored in the relay apparatus 10'C, the receive apparatus 50 repeatedly requests remaining file data to the nearest relay apparatus 10'C until the received data amount O_R reaches the file size L (L1).

Although a case that a file is transferred to one receive apparatus has been described as an example in the above description, the present invention can be applied for a case that a file is transferred to a plurality of receive apparatuses (multicast). In this case, destination address group D including addresses $R_1$-$R_N$ of a plurality of receive apparatuses, instead of destination address R, may be sent to the relay apparatus 10' from the send apparatus 30. The relay apparatus 10' may store each of the addresses $R_1$-$R_N$ in the file table by associating it with the file identifier I, the file path P and the file size L.

According to the file transfer system of this embodiment, a plurality of relay apparatuses can be provided between the send apparatus and the receive apparatus. Even when the send apparatus and the receive apparatus are far apart with respect to network route, the send apparatus can send a file to a relay apparatus nearest to the send apparatus, and the receive apparatus can receive a file from a relay apparatus nearest to the receive apparatus. Thus, the time required for sending and receiving can be decreased.

Third Embodiment

Next, the third embodiment will be described.

Figure 5:
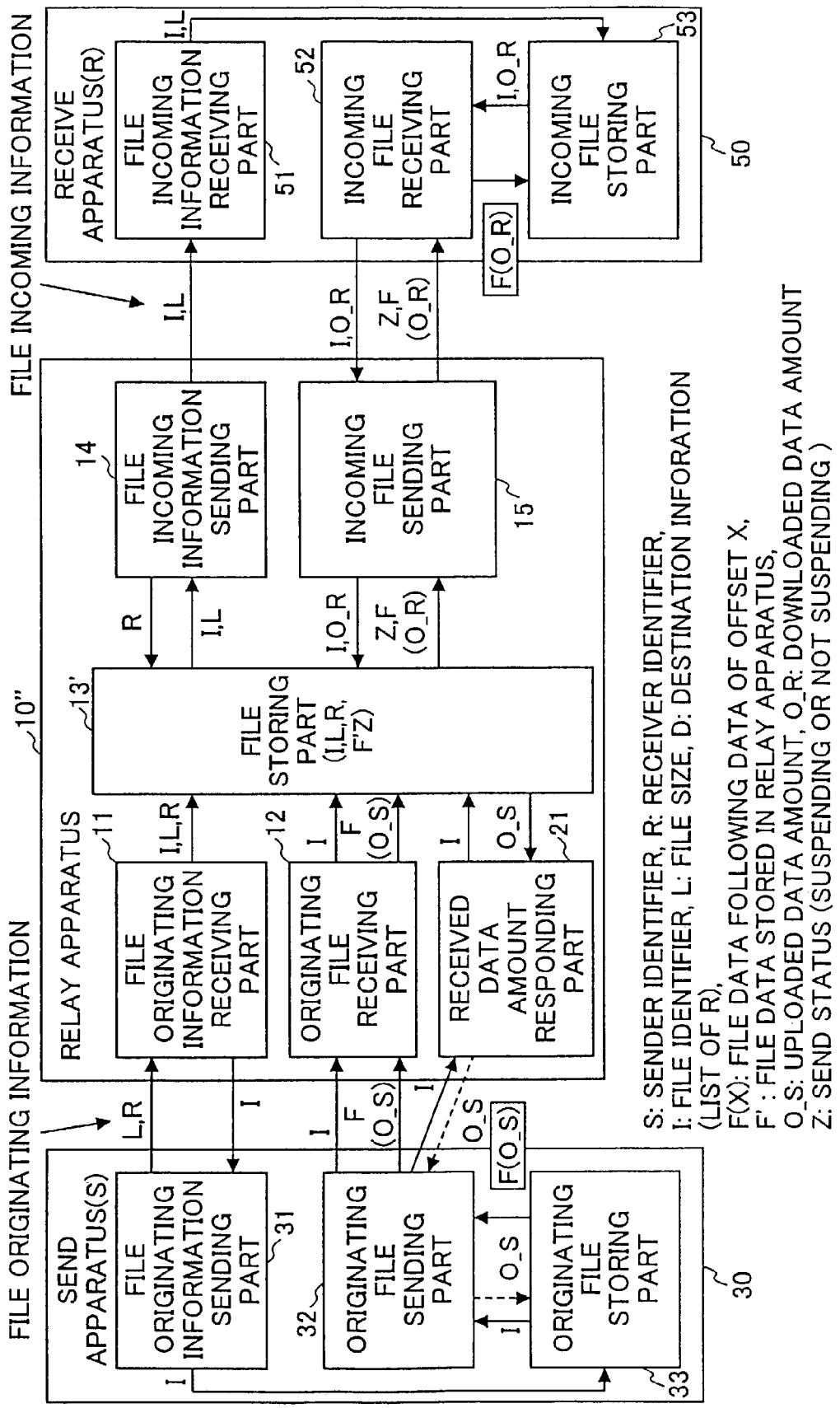
FIG. 5 is a schematic block diagram showing whole configuration of a file transfer system of a third embodiment.

FIG. 5 is a schematic block diagram showing a whole structure of the file transfer system of this embodiment. In the third embodiment, the send apparatus 30, the receive apparatus 50 and a relay apparatus 10" are the same as the send apparatus 30, the receive apparatus 50 and a relay apparatus 10 of the first embodiment basically. Following points are different from the first embodiment. That is, in this embodiment, a field (which will be called "send suspending field") which records file send suspending in the file table of the file storing part 13' of the relay apparatus 10" is added, in which, when the send apparatus 30 suspends sending file, data representing send status is recorded in the "send suspending field", for example, a value or a character string representing "true" is recorded. When the file sending is not suspended, a value or a character string representing "false" is recorded. In addition, the relay apparatus 10" includes a received data amount response part 21 for sending an uploaded data amount to the send apparatus 30, wherein the uploaded data amount is a data amount of file data which has been sent to the relay apparatus from the send apparatus in file data to be sent.

Figure 6:
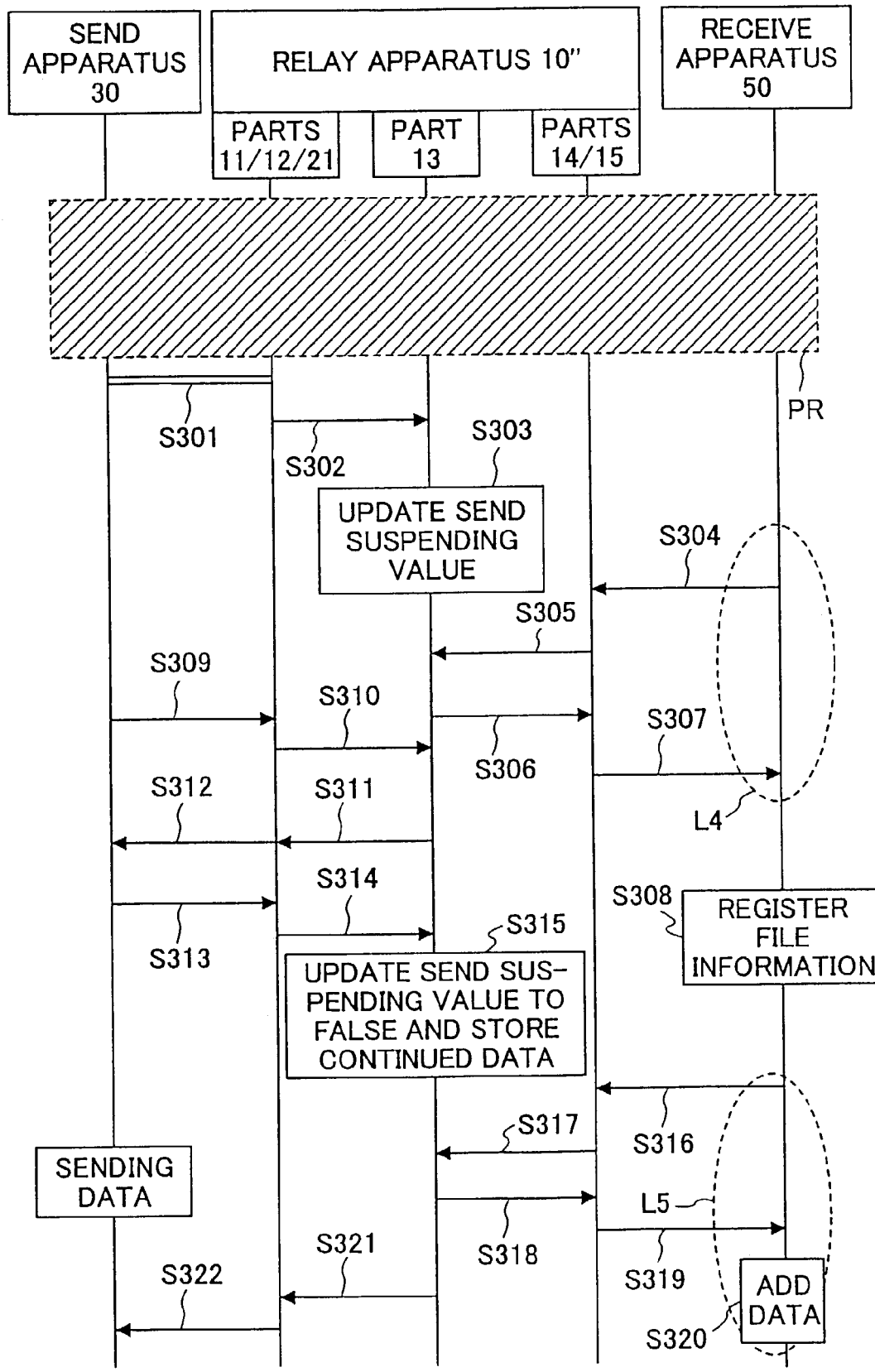
FIG. 6 is a flowchart showing an outline of processing flow of the third embodiment.

Next, the process procedure of this embodiment will be described with reference to FIG. 6. FIG. 6 is a flowchart showing an outline of a process flow of this embodiment.

In this embodiment, the process PR which is indicated by the diagonally shaded area in FIG. 6 is the same as the corresponding process of the first embodiment which is enclosed in a rectangle of broken lines in FIG. 2. In the process, the send apparatus 30 sends the originating file information send to the relay apparatus 10". In response to this, the file identifier is sent from the relay apparatus 10" to the send apparatus 30. In addition, the receive apparatus 50 sends the incoming file information request to the relay apparatus 10". In response to this request, the relay apparatus 10" sends the file identifier and the file size as the incoming file information to the receive apparatus 50. The receive apparatus 50 stores these as file information.

When the send apparatus suspends file sending in step 301, a value representing "true" which indicates send suspending status is recoded in the field of the send suspending status in steps 302, 303.

The relay apparatus 10" which is realized by the relay apparatus program launched by the HTTP server receives an incoming file information request (a POST method of an HTTP request) from the receive apparatus 50 in step 304. When the first line of the entity body is a character string representing "incoming file request", the relay apparatus 10" reads the file identifier I and the received data amount O_R which are stored in the entity body in step 305. In addition, the relay apparatus 10" obtains, from the file table of the file storing part 13, send status Z and the file path P which are stored with the file identifier I wherein the file identifier I is associated with the send status Z and the file path P in step 306. Then, the relay apparatus 10" stores the send suspending status in an entity body of an HTTP response and send the HTTP response to the receive apparatus 50 in step 307.

The above-mentioned process is repeated until the received data amount O_R reaches the file size L (L4).

The receive apparatus 50 which received the HTTP response registers file information in step 308, and reads the value Z of send suspending status from the first line of the entity body. When the value is "true", it is suspended to receive a file. When the value is "false", the receive apparatus 50 further sends an incoming file request to the relay apparatus 10" in step 316. When the first line of the entity body of the POST method is a character string representing "incoming file request", the relay apparatus 10" reads the file identifier I and the received data amount O_R which are stored following the character string, reads the file path P which is associated with the file identifier I from the file table of the file storing part 13 in step 317. In addition, the relay apparatus 10" reads file data following the received data amount of the file corresponding to the file path P from the file storing part 13' in step 318, and stores the file data in an entity body of an HTTP response and returns the HTTP response to the receive apparatus 50 in step 319.

The receive apparatus 50 which received the HTTP response obtains a file path P' of the file from the stored file information, and stores the content of the entity body of the HTTP response by adding the content to file data already stored in the file path P' as continued data in step 320, wherein the content is file data F(O_R) which follows the received data amount O_R.

The above-mentioned process is repeated until the received data amount reaches the file size L (L5).

When resuming file sending, the send apparatus 30 stores character strings which represent a stored data amount O_S and the file identifier I in an entity body of a POST method of an HTTP request by separating the character strings by a line feed, and sends the HTTP request to the relay apparatus 10" in step 309.

When the first line of the entity body of the POST method is a character string representing "stored data amount", the relay apparatus 10" realized by a relay apparatus program launched by the HTTP server reads the following file identifier I in step 310, obtains the file path P registered with the file identifier which is associated with the file path P from the file table in step 311. Then, the relay apparatus 10" stores the amount of data stored in the file path P in the entity body of the HTTP response and returns the HTTP response to the send apparatus 30 in step 312.

The send apparatus 30 reads the stored data amount O_S from the entity body of the HTTP response from the relay apparatus 10", and stores character strings representing "originating file" and the file identifier I in an entity body of a POST method of an HTTP request while separating the character strings by a line feed. After that, the send apparatus 30 stores file-data F(O_S) (for example, binary sequence) which follows data of the "stored data amount" of the file data in the entity body, and starts to send the data to the relay apparatus 10" in step 313.

When the first line of the entity body of the POST method is a character string representing "originating file", the relay apparatus 10" reads the file identifier, obtains the file path which is registered with the file identifier which is associated with the file path, reads file data stored in the entity body and starts to store the file data such that the file data follows the tail end of data already stored in the file path in step 314. In addition, the relay apparatus 10" changes the value Z of the send suspending status to "false" in step 315.

When all of the file data is stored in the file storing part 13, that is, when the uploaded file data O_S reaches the file size L, the relay apparatus 10" notifies the send apparatus 30 of completion of data storing in step 321 and 322. In response to the notification, the send apparatus 30 ends file transfer process.

Although a case that a file is transferred to one receive apparatus has been described as an example in the above description, the present invention can be applied for a case that a file is transferred to a plurality of receive apparatuses (multicast). In this case, destination address group D including addresses $R_1$-$R_N$ of a plurality of receive apparatuses, instead of destination address R, may be sent to the relay apparatus 10" from the send apparatus 30. The relay apparatus 10" may store each the addresses $R_1$-$R_N$ in the file table by associating it with the file identifier I, the file path P and the file size L.

According to the file transfer system, since the relay apparatus has a part which stores the send status of a file and sends the send status to the receive apparatus, the receive apparatus which performs receive operation concurrently with operation of the send apparatus can recognize that sending is suspended when the send apparatus suspends sending at some midpoint, so that the receive apparatus can suspend receive operation even if the amount of received data does not reach the file size yet. In addition, since the relay apparatus includes a part for sending stored file data amount in response to inquiry from the send apparatus, the send apparatus can resume file sending from the start of the remained file data. Further, since the receive apparatus includes a part which notifies the relay apparatus of the received data amount and receives continued data from the relay apparatus, the receive apparatus can resume file receiving from the start of the remained file data.

Fourth Embodiment

A forth embodiment of the present invention will be described in the following.

Figure 7:
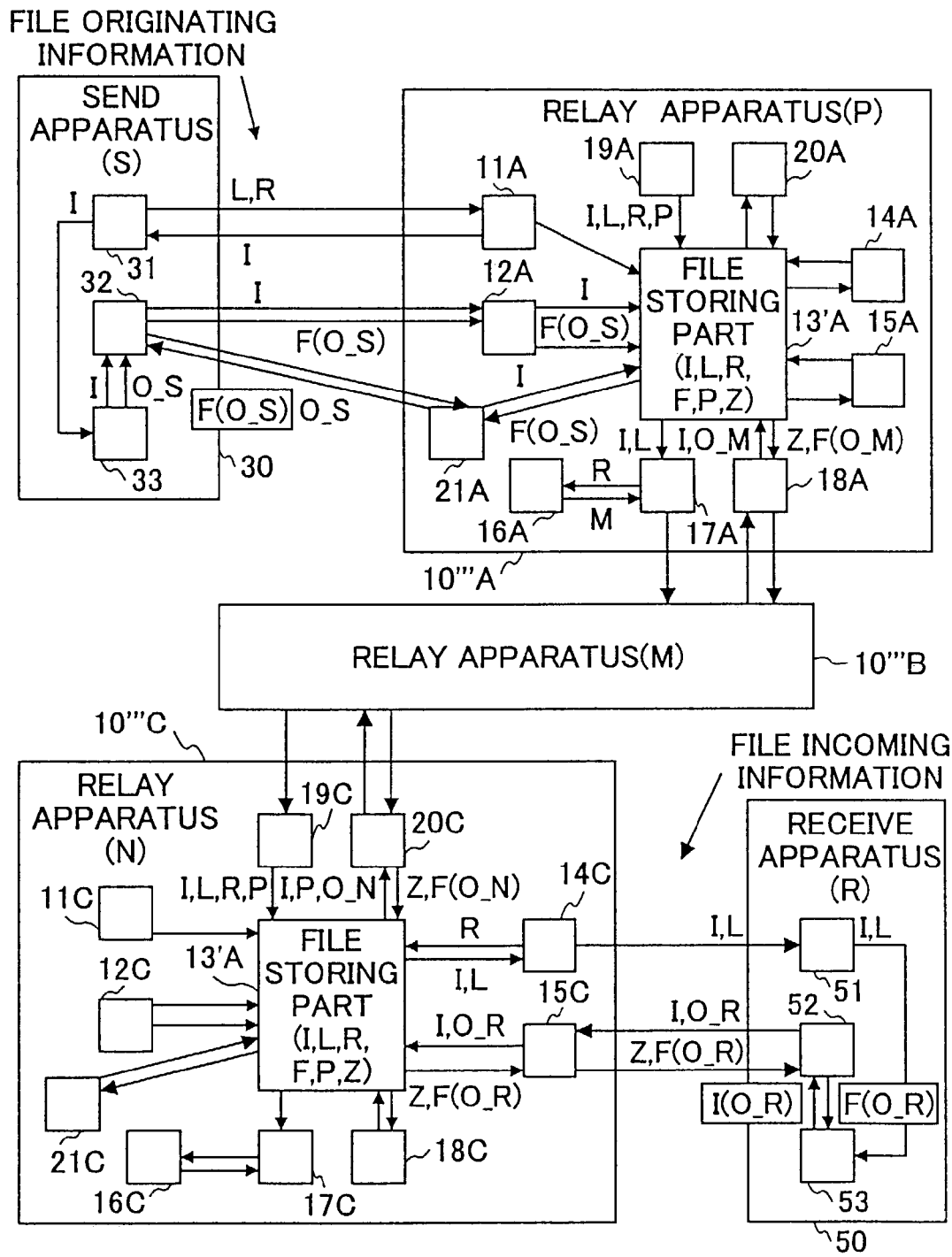
FIG. 7 is a schematic block diagram showing whole configuration of a file transfer system of a fourth embodiment.

The send apparatus, the receive apparatus and the relay apparatus of this embodiment as shown in FIG. 7 have all features which are included in the send apparatus, the receive apparatus and the relay apparatus of the second embodiment. The different point is that each of the relay apparatuses 10'''A, 10'''B and 10'''C includes received data amount response part 21 (21A, 21C) described in the above-mentioned third embodiment.

Figure 8:
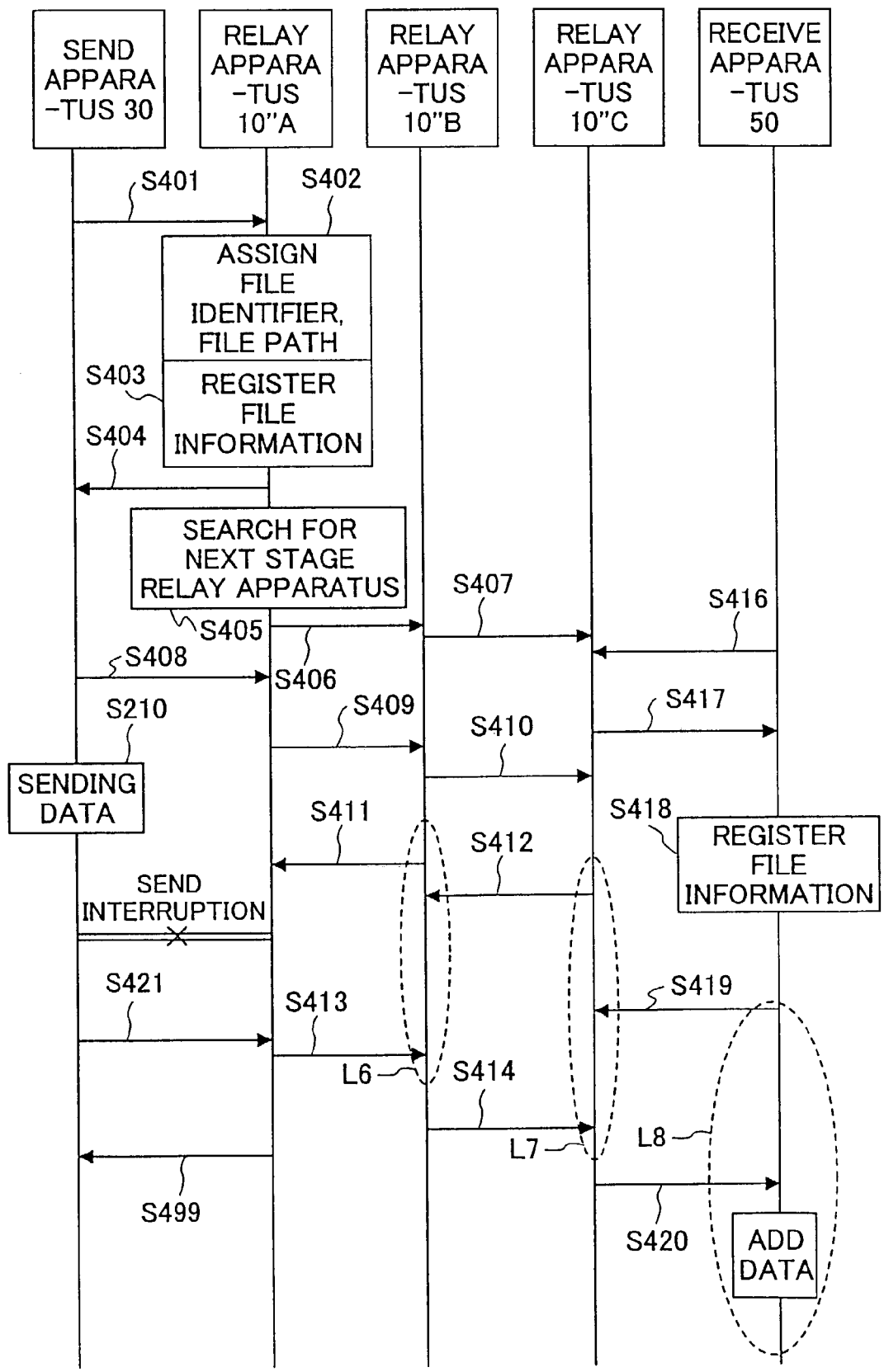
FIG. 8 is a flowchart showing an outline of processing flow of the fourth embodiment.

The process procedure of this embodiment will be described with reference to FIG. 8. FIG. 8 is a flowchart showing an outline of processes of this embodiment.

The send apparatus 30 notifies the relay apparatus 10'''A which is the nearest to the send apparatus of the file size and the destination IP address of the file to be sent in the same way as the first embodiment in step 401.

The relay apparatus 10'''A assigns a unique value to the file as the file identifier on the basis of time information and the IP address R of the relay apparatus 10'''A in step 402. Then, the relay apparatus 10'''A registers the file identifier I, the file size L and the destination IP address R in the file storing part 13'A in the same way as the first embodiment in step 403, and notifies the send apparatus 30 of the file identifier I in step 404.

In addition, the relay apparatus 10'''A checks the destination IP address R against the network part of the transfer destination determining part (the routing table) 16A. When there is a match, the relay apparatus 10'''A obtains URL "M" of a corresponding transfer destination relay apparatus 10'''B in step 405.

Next, the relay apparatus 10'''A sends relay file information to the URL "M" in step 406, wherein the relay file information includes character strings representing "relay file information send", the file identifier I, the file size L and the destination IP address R passing through the relay apparatus 10'''B which are separated by line feeds and are stored in an entity body of a POST method of an HTTP request.

In the relay apparatus 10'''B which received the POST method of the HTTP request, when the first line of the entity body of the POST method is a character string representing "relay file information send", the relay apparatus program launched by the HTTP server reads the file identifier I, the file size L and the destination IP address R which follows the character string. In addition, the relay apparatus 10'''B determines a file path PB to which the file is stored on the basis of the file identifier, and stores the file identifier I, the file path PB, the file size L and the destination address R in the file storing part 13'B (in the file table, more specifically). In addition, the relay apparatus 10'''B checks the destination IP address R against the network part of the transfer destination determining part (the routing table) 16B. When there is a match, the relay apparatus 10'''B obtains URL "N" of a corresponding transfer destination relay apparatus 10'''C.

Next, the relay apparatus 10'''B sends relay file information to the URL "N" in step 407, wherein the relay file information includes character strings representing "relay file information", the file identifier I, the file size L and the destination IP address R passing through the relay apparatus 10'''C which are separated by line feeds and are stored in an entity body of the POST method of the HTTP request.

Accordingly, the file information reaches finally the relay apparatus 10'''C which is the nearest to the receive apparatus 50 and which takes charge of the destination address R.

On the other hand, the send apparatus 30 stores a character string representing "originating file send", the file identifier I and content data of the file in an entity body of a POST method, and starts to send it to the nearest relay apparatus 10'''A in step 408.

When the first line of the entity body of the post method is a character string representing "originating file send", the relay apparatus 10'''A reads the following file identifier I, searches the routing table, and judges whether transfer of the file is necessary. When the transfer is necessary, the relay apparatus 10'''A obtains a URL of a relay apparatus of the next stage to which the file should be transferred, stores a character string representing "relay file arrive" and the file identifier I in an entity body of a POST method of an HTTP request while separating them by a line feed, and sends the HTTP request to the relay apparatus 10'''B of the next stage in step 409.

The relay apparatus 10'''A reads sent file data, starts to store the file data in an area of the file storing part 13'A which is specified by the file path PA. Storing of the file data is repeated until the received data amount O_S reaches the file size L in the file storing part 13'A. When all of the file data is stored in the file storing part 13'A, the relay apparatus 10'''A notifies the send apparatus 30 of completion of data storing in step 499. In response to this notification, the send apparatus 30 ends the file transfer process.

When the relay apparatus 10'''B receives the HTTP request including the character string representing "relay file arrive", the relay apparatus 10'''B stores the character string representing "relay file arrive" and the file identifier I in an entity body of a POST method of an HTTP request while separating them by a line feed and sends the HTTP request to the relay apparatus 10'''C of the next stage in step 410.

When the relay apparatuses 10'''B and 10'''C receive a request including "relay file arrive", each of the relay apparatuses stores character strings representing "relay file request", the file identifier I, received data amount O_M or O_N (which is 0 in the first time) in an entity body of a POST method while separating these by line feeds, sends it to the previous stage relay apparatus 10'''A or 10'''B in steps 411 and 412. In the above-mentioned second embodiment, when the relay apparatuses 10B and 10C receive "relay file information", each of the relay apparatuses stores character strings representing "relay file request", the file identifier I, received data amount (which is 0 in the first time) in an entity body of a POST method while separating these by line feeds, sends the data to the previous stage relay apparatus. On the other hand, according to the fourth embodiment, "relay file request" is not performed at the timing of receiving the relay file information, instead, "relay file request" is performed after notification of "relay file arrive".

In response to the receive file request, when the first line of the entity body of the POST method is a character string representing "relay file request", the relay apparatus program of each of the relay apparatus 10'''A and 10'''B of the previous stage reads the file identifier I and received data amount O_M or O_N which follow the character string, obtains the file path PA or PB which is associated with the file identifier I from the file table of the file storing part 13A or 13B, stores data which follows the file data of the file path PA or PB of the received data amount O_M or O_N and a value Z indicating the send suspending status in an entity body of an HTTP response, and sends the HTTP response to the relay apparatus 10'''B or 10'''C of the next stage in steps 413 and 414.

Each of the relay apparatuses 10'''B and 10'''C which received the HTTP response suspends receiving file data when the value Z representing send suspending status is "true". When the value Z representing send suspending status is "false", each of the relay apparatuses 10'''B and 10'''C obtains the file path PB or PC of the file which is stored in the file storing part 13'B or 13'C, and adds following content (remaining data of the file data) in the entity body of the HTTP response to data which is already stored in the file path.

In each of the relay apparatus 10'''B and 10'''C, the relay file request and the corresponding file sending are repeated (L6,7) until the received data amount O_M or O_N reaches the file size which is notified by the relay information beforehand reaches the file size L, or until the value Z representing the originating suspending status becomes "true".

The receive apparatus 50 inquires about newly arriving file information addressed to the destination address R to the nearest relay apparatus 10'''C in step 416 in the same way as that of the first embodiment. In response to this inquiry, the relay apparatus 10'''C sends the file identifier I and the file size L to the receive apparatus 50 in step 417.

The receive apparatus 50 obtains the file path which is registered by being associated with the file identifier I, obtains received data amount O_R which corresponds to the file path, and stores character strings representing "incoming file request", the file identifier I and the received data amount O_R (which is 0 for the first time) in an entity body of a POST method while separating them by line feeds and sends it to the relay apparatus 10'''C in step 419.

In response to the incoming file request, when the first line of the entity body of the received POST method is the character string representing "relay file request", the relay apparatus 10'''C reads the file identifier I and the received data amount O_R which are stored following the character string, obtains the file path PC registered being associated with the file identifier I from a file table of the file storing part 13'C, stores file data which follows data of the received data amount O_R of the file of the file path C and the value Z indicating the send suspending status in an entity body of an HTTP response, and sends the HTTP response to the receive apparatus 50 in step 420.

When the value Z indicating the send suspending status is "true", the receive apparatus 50 which receives the HTTP response suspends receiving the file. When the value Z indicating the send suspending status is "false", the receive apparatus 50 obtains the file path of the file which is stored in the incoming file storing part 53, and stores the following content (remaining data of the file data) in the entity body of the HTTP response.

In the receive apparatus 50, sending the file data is repeated (L8) until the received data amount O_R reaches the file size L or until the value Z indicating the send suspending status becomes "true".

When the send apparatus 30 resumes sending the file, the send apparatus 30 stores character strings representing stored data amount O_S and the file identifier I in an entity body of a POST method of an HTTP request while separating them by a line feed, and sends the HTTP request to the relay apparatus 10'''A in step 412.

When the first line of the entity body of the POST method is a character string representing "stored data amount", the relay apparatus 10'''A reads the file identifier I, obtains the file path PA which is associated with the file identifier from the file table, stores the amount of data which is stored in the file path PA in an entity body of an HTTP response and sends the HTTP response to the send apparatus 30.

The send apparatus 30 reads the stored data amount O_S from the entity body of the HTTP response sent from the relay apparatus 10'''A, and stores character strings representing "originating file" and the file identifier I in an entity body of a POST method of an HTTP request while separating the character strings by a line feed. After that, the send apparatus 30 stores file data (binary sequence, for example) F(O_S) which follows data of the received data amount of the file data, and starts to send the data to the relay apparatus 10'''.

When the first line of the entity body of the POST method is a character string representing "originating file", the relay apparatus 10'''A reads the file identifier I, obtains the file path which is associated with the file identifier I from the file table, reads the "file data" stored in the entity body following the file identifier, and starts to store the data in a part following the tail end of data which is already stored in the file path PA. In addition, the value Z of the send suspending status is changed to "false".

When all of the file data are stored in the file storing part 13, that is, when the uploaded file data amount O_S reaches the file size L, the relay apparatus 10'''A notifies the send apparatus 30 of completion of data storing in step 499. In response to the notification, the send apparatus 30 ends file transfer process.

Processes hereinafter are performed in the same way as the before mentioned processes (steps 409, 410, 411, 412, 413, 414, 420, L6, L7, L8).

Although a case that a file is transferred to one receive apparatus has been described as an example in the above description, the present invention can be applied for a case that a file is transferred to a plurality of receive apparatuses (multicast). In this case, destination address group D including addresses $R_1$-$R_N$ of a plurality of receive apparatuses, instead of destination address R, may be sent to the relay apparatus 10''' from the send apparatus 30. The relay apparatus 10''' may store each of the addresses $R_1$-$R_N$ in the file table by associating it with the file identifier I, the file path P and the file size L.

According to the file transfer system of this embodiment, since it is informed from a relay apparatus to a next stage relay apparatus that the send apparatus resumes file sending, the data which the send apparatus resume sending is resumed to be transferred between the relay apparatuses.

According to the present invention, since file transfer from the send apparatus to the relay apparatus is performed concurrently with file transfer from the relay apparatus to the receive apparatus, receiving can be started before sending is completed. In addition, since originating file information including the file size of the transferred file is sent from the send apparatus to the relay apparatus and the receive apparatus, the receive apparatus can repeat file receiving until the received file data reaches the file size. As a result, in the case where send speed of the send apparatus is slower than receive speed of the receive apparatus, even when data amount received by the receive apparatus does not reach the file size after the receive apparatus receives all data which is already stored in the relay apparatus, file transfer speed can be adjusted by repeating file receiving process after waiting until following data is stored in the relay apparatus.

The present invention is not limited to the specifically disclosed embodiments, and variations and modifications may be made without departing from the scope of the invention.

The invention claimed is:

1. A file transfer system which transfers a file from a send apparatus to a receive apparatus by way of a relay apparatus, said file transfer system comprising:
said send apparatus configured to send said file;
said receive apparatus configured to receive said file; and
a relay apparatus configured to receive said file from the send apparatus and send the file to the receive apparatus,
said relay apparatus in said file transfer system comprising:
a file storing part configured to store said file, a file identifier, a file size and a destination address, which are associated with each other;
a file originating information receiving part connected to said file storing part and said send apparatus and configured to receive file originating information including said file size and said destination address from said send apparatus, assign said file identifier to said file, register said file identifier, said file size and said address in said file storing part, and notify said send apparatus of said file identifier;
an originating file receiving part connected to said file storing part and said send apparatus and configured to receive said file identifier and file data corresponding to said file identifier from said send apparatus, and store said file identifier and said file data in said file storing part;
a file incoming information sending part connected to said file storing part and said receive apparatus and configured to judge a destination of said file on the basis of said destination address and to send file incoming information including said file identifier and said file size to said receive apparatus corresponding to the destination before sending said file data; and
an incoming file sending part connected to said file storing part and said receive apparatus and configured to receive, from said receive apparatus, said file identifier and a data amount which said receive apparatus already received as said file data, and send, to said receive apparatus, data which is not yet received by said receive apparatus in said file data stored in said file storing part,
said send apparatus comprising:
an originating file storing part configured to store said file and said file identifier, which are associated with each other;
an originating file information sending part connected to said relay apparatus and configured to send file originating information including said file size and said destination address to said relay apparatus before sending said file data, receive said file identifier from said relay apparatus, and store said file identifier in said originating file storing part; and
an originating file sending part connected to said relay apparatus and configured to send said file identifier and said file data corresponding to said file identifier to said relay apparatus, and
said receive apparatus comprising:
an incoming file storing part configured to store said file data, said file identifier and said file size, which are associated with each other;
a file incoming information receiving part connected to said relay apparatus and configured to receive said file incoming information including said file identifier and said file size from said relay apparatus before receiving said file data, and register said file identifier and said file size in said incoming file storing part; and
an incoming file receiving part connected to said relay apparatus and configured to perform a procedure repeatedly until received data amount of said file reaches said file size,
wherein, in said procedure, said incoming file receiving part sends said file identifier and said received data amount to said relay apparatus, receives data which is not yet received in said file from said relay apparatus, and adds said data to already received data.

2. The file transfer system as claimed in claim 1,
said relay apparatus further comprising:
a transfer destination determining part which judges whether it is necessary to transfer said file to a second relay apparatus on the basis of said destination address, and determines said second relay apparatus when it is necessary to transfer said file to another relay apparatus;
a file relay information sending part which sends file relay information including said destination address, said file identifier and said file size to said second relay apparatus;
a relay file sending part which receives said file identifier and a data amount which said second relay apparatus already received, and sends data which follows data of said data amount which said second relay apparatus already received;
a file relay information receiving part which receives said file relay information from a third apparatus, and registers said destination address, said file identifier and said file size included in said file relay information in said file storing part; and
a relay file receiving part which performs a second procedure repeatedly until received data amount of said file reaches said file size, wherein, in said second procedure, said relay file receiving part sends said file identifier and said received data amount to said third relay apparatus, receives data which is not yet received in said file from said third relay apparatus, and adds said data received from said third relay apparatus to already received data.

3. The file transfer system as claimed in claim 2,
said relay file sending part further comprising a part which sends information representing file send status which are associated with said file identifier before sending said file data, and
said relay file receiving part further comprising apart which receives said information representing file send status from said third relay apparatus, suspends data receiving when said file send status is send suspending status, and receives data which is not yet received in said file when said file send status is not send suspending status.

4. The file transfer system as claimed in claim 1,
said file storing part comprising:
a part which stores information representing file send status which indicates whether said send apparatus suspends file sending, said information being associated with said file identifier, wherein
said originating file receiving part changes said information representing file send status to a value indicating suspending when said send apparatus suspends file sending; and said incoming file receiving part sends said information representing file send status before sending said file data to said receive apparatus, and said relay apparatus further comprising:

a received data amount responding part which notifies said send apparatus of received data amount of said file stored in said file storing part when said relay apparatus receives inquiry about said received data amount from said send apparatus; wherein said originating file sending part in said send apparatus sends data which follows data of said received data amount to said relay apparatus when said send apparatus resumes file sending, and said incoming file receiving part in said receive apparatus receives said information representing file send status from said relay apparatus, suspends file receiving when said file send status is suspending status, and receives data which is not yet received in said file when said file send status is not suspending status.

5. The file transfer system as claimed in claim 1, said file incoming information receiving part in said receiving apparatus comprising:

a part which sends said destination address to said relay apparatus, and said file incoming information sending part in said relay apparatus comprising:

a part which receives said destination address and sends said incoming file information on a file destined for said destination address.

6. The file transfer system as claimed in claim 1, wherein said originating file information sending part assigns said file identifier to said file to be transferred, including said file identifier to said originating file information, and said file originating information receiving part in said relay apparatus obtains said file identifier included in said originating file information instead of assigning said file identifier to said file.

7. The file transfer system as claimed in claim 1, wherein said data amount is a number of bytes.

8. A relay apparatus configured to receive a file from a send apparatus and send the file to a receive apparatus via a network, said relay apparatus comprising:

a file storing part configured to store said file, a file identifier, a file size and a destination address, which are associated with each other, a file originating information receiving part connected to said file storing part and said send apparatus and configured to receive file originating information including said file size and said destination address from said send apparatus, assign said file identifier to said file, register said file identifier, said file size and said address in said file storing part, and notify said send apparatus of said file identifier;

an originating file receiving part connected to said file storing part and said send apparatus and configured to received said file identifier and file data corresponding to said file identifier from said send apparatus, and store said file identifier and said file data in said file storing part;

a file incoming information sending part connected to said file storing part and said receive apparatus and configured to judge a destination of said file on the basis of said destination address and to send file incoming information including said file identifier and said file size to said receive apparatus corresponding to the destination before sending said file data; and an incoming file sending part connected to said file storing part and said receive apparatus and configured to perform a procedure to receive, from said receive apparatus, said file identifier and a data amount which said receive apparatus already received as said file data, and send, to said receive apparatus, data which is not yet received by said receive apparatus in said file data stored in said file storing part, wherein said incoming file sending part performs said procedure repeatedly until said data amount reaches said file size.

9. The relay apparatus as claimed in claim 8, further comprising:

a transfer destination determining part which returns an address of another relay apparatus corresponding to a destination address; and a file relay information sending part which receives said address of said another relay apparatus from said transfer destination determining part, and sends file relay information by using said address.

10. The relay apparatus as claimed in claim 8, said file storing part further comprising a field in which file send status is recorded, and said relay apparatus further comprising a received data amount responding part which sends, to said send apparatus, data amount in said file data which is already sent from said send apparatus to said relay apparatus.

11. A file transfer method performed by a relay apparatus configured to receive a file from a send apparatus and send the file to a receive apparatus via a network, wherein said relay apparatus includes a file storing part configured to store said file, a file identifier, a file size and a destination address, which are associated with each other, said file transfer method comprising the steps of:

receiving file originating information including said file size and said destination address from said send apparatus, assigning said file identifier to said file, registering said file identifier, said file size and said address in said file storing part, and notifying said send apparatus of said file identifier;

receiving said file identifier and file data corresponding to said file identifier from said send apparatus, and storing said file identifier and said file data in said file storing part;

judging a destination of said file on the basis of said destination address and sending file incoming information including said file identifier said file size to said receive apparatus corresponding to the destination before sending said file data; and performing a procedure to receive, from said receive apparatus, said file identifier and a data amount which said receive apparatus already received as said file data, and sending, to said receive apparatus, data which is not yet received by said receive apparatus in said file data stored in said file storing part, wherein said relay apparatus performs said procedure repeatedly until said data amount reaches said file size.

12. The file transfer method as claimed in claim 11, further comprising the steps of:

judging whether it is necessary to transfer said file according to a destination address of said file;

determining transfer destination when transfer of said file is necessary; and sending file relay information including said destination address, said file identifier and said file size to said transfer destination.

13. The file transfer method as claimed in claim 11, further comprising the steps of:
  sending file send status which indicates whether said send apparatus suspends file sending to said receive apparatus before sending said data; wherein
  said receive apparatus suspends file receiving when said file send status indicates suspending, receives data which is not yet received in said file when said file send status does not indicate suspending.

14. A computer readable medium storing program code for causing a computer to execute a file transfer method conducted using a relay apparatus configured to receive a file from a send apparatus and send the file to a receive apparatus via a network, said computer readable medium comprising:
  program code means for receiving file originating information including said file size and said destination address from said send apparatus, assigning said file identifier to said file, registering said file identifier, said file size and said address in said file storing part, and notifying said send apparatus of said file identifier;
  program code means for receiving said file identifier and file data corresponding to said file identifier from said send apparatus, and storing said file identifier and said file data in said file storing part;
  program code means for judging a destination of said file on the basis of said destination address and sending file incoming information including said file identifier said file size to said receive apparatus corresponding to the destination before sending said file data; and
  program code means for performing a procedure to receive, from said receive apparatus, said file identifier and a data amount which said receive apparatus already received as said file data, and sending, to said receive apparatus, data which is not vet received by said receive apparatus in said file data stored in said file storing part,
  wherein said relay apparatus performs said procedure repeatedly until said data amount reaches said file size.

15. The computer readable medium as claimed in claim 14, further comprising:
  program code means for judging whether it is necessary to transfer said file according to a destination address of said file;
  program code means for determining transfer destination when transfer of said file is necessary; and
  program code means for sending file relay information including said destination address, said file identifier and said file size to said transfer destination.

16. The computer readable medium as claimed in claim 14, further comprising:
  program code means for sending file send status which indicates whether said send apparatus suspends file sending before sending said file.

17. A computer readable medium including a program for causing a computer to execute a file transfer method conducted using a relay apparatus configured to receive a file from a send apparatus and send the file to a receive apparatus via a network stored thereon, said method comprising:
  receiving file originating information including said file size and said destination address from said send apparatus, assigning said file identifier to said file, registering said file identifier, said file size and said address in said file storing part, and notifying said send apparatus of said file identifier;
  receiving said file identifier and file data corresponding to said file identifier from said send apparatus, and storing said file identifier and said file data in said file storing part;
  judging a destination of said file on the basis of said destination address and sending file incoming information including said file identifier said file size to said receive apparatus corresponding to the destination before sending said file data; and
  performing a procedure to receive, from said receive apparatus, said file identifier and a data amount which said receive apparatus already received as said file data, and sending, to said receive apparatus, data which is not yet received by said receive apparatus in said file data stored in said file storing part,
  wherein said relay apparatus performs said procedure repeatedly until said data amount reaches said file size.

18. The computer readable medium as claimed in claim 17, further comprising:
  judging whether it is necessary to transfer said file according to a destination address of said file;
  determining transfer destination when transfer of said file is necessary; and
  sending file relay information including said destination address, said file identifier and said file size to said transfer destination.

19. The computer readable medium as claimed in claim 17, further comprising:
  sending file send status which indicates whether said send apparatus suspends file sending before sending said file.

* * * * *